United States Patent [19]
Kindl et al.

[11] 3,820,903
[45] June 28, 1974

[54] DEVICE FOR PRODUCING A LIGHT PLANE

[75] Inventors: Helmut Kindl, Muenchen, Germany; Viktor Met, Palo Alto, Calif.

[73] Assignee: Siemens Aktiengesellschaft, Berlin and Munich, Germany

[22] Filed: Aug. 31, 1972

[21] Appl. No.: 285,217

[30] Foreign Application Priority Data
Sept. 1, 1971  Germany............................ 2143812

[52] U.S. Cl................. 356/138, 356/153, 350/171, 331/94.5 A
[51] Int. Cl. ............................................ G01b 11/27
[58] Field of Search ........... 356/138, 153, 172, 241, 356/248, 255; 350/97, 171, 293; 331/94.5 A

[56] References Cited
UNITED STATES PATENTS
| | | | |
|---|---|---|---|
| 3,189,744 | 6/1965 | Ogland.......................... | 356/293 UX |
| 3,240,113 | 3/1966 | Stechemesser et al. ............ | 350/293 |
| 3,471,234 | 10/1969 | Studebaker..................... | 356/138 X |
| 3,551,061 | 12/1970 | Glowa............................... | 356/241 |

*Primary Examiner*—Ronald L. Wibert
*Assistant Examiner*—Paul K. Godwin
*Attorney, Agent, or Firm*—Hill, Gross, Simpson, Van Santen, Steadman, Chiara & Simpson

[57] ABSTRACT

A device for producing a plane of laser light from a laser beam for use in controlling machines such as earth moving machines, rail adjusting machines, and rail directing machines characterized by a glass cone having a mirrored outer circumference to provide a conical reflecting surface arranged in a laser beam to reflect the beam as a plane of laser light. By adjusting the inclination of the axis of the cone with respect to the axis of the laser beam, the inclination of the plane of laser light with respect to the beam can be changed. By arranging the glass cone with its axis on the axis of the beam, a plane extending 360° from the device can be produced and if the axis of the cone is coaxial with the axis of the beam, the intensity of light extending in all directions is substantially equal. By off-setting the axis of the cone with respect to the axis of the laser beam, the laser beam can be converted to a plane of light extending from the device as an angular segment of less than 360°.

9 Claims, 1 Drawing Figure

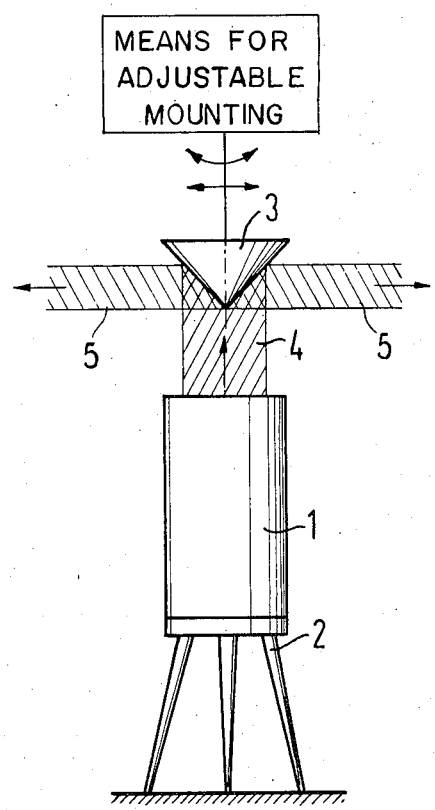

DEVICE FOR PRODUCING A LIGHT PLANE

BACKGROUND OF THE INVENTION

1. Field of the Invention

The present invention is directed to a device for producing a plane of laser light utilized in controlling of machines such as earth moving machines and rail adjusting machines.

2. Prior Art

A control device to provide a reference for a machine such as an earth moving machine or rail directing machine is well known in the art. One type of control device utilizes a laser beam to provide a reference line along which the machine moves. The machine has sensing devices such as photo detecting device for determining or measuring deviation from the reference line which measured deviation is used to provide corrections to maintain the working portion of the machine in the proper position. A difficulty with a control device, which utilizes a laser beam, is a lack of freedom of movement in a direction transverse to the length of the reference beam.

To provide freedom of movement along the length of the beam and transverse thereto, control devices have been proposed in which the laser beam is spread to form a laser light reference plane. The machine utilizes photo detecting devices to provide an error signal that is used to automatically correct the machines working portions back to the desired plane of operation. With the use of the laser light plane as a reference plane, the device can be controlled while moving along a curved path through the terrain without requiring continual changes of the position of the control device.

Reference planes of laser light have been provided by utilizing a cylindrical lens to expand the laser beam into a light plane. Another method of producing a light plane is the use of a mirror or prism for reflecting the beam through an angle of 90° and rotating the mirror or prism on the beam axis to obtain a continuing moving or sweeping beam to produce a plane of light. One disadvantage with the use of a cylindrical lens suggested by the prior art is that it is impossible to obtain a plane extending 360° from the device. A disadvantage with the rotating mirror or prism is that it requires energy for the drive motor which is a particular drawback for the application of moveable measuring arrangements in a rough terrain. Another undesirable feature of the rotating mirror or prism is the structure which is required to provide a sturdy, maintainance free operation. Furthermore the elimination of mechanical moving parts is desirable to prevent misalignments of the reference plane and to remove vibrations that could affect the plane's position.

SUMMARY OF THE INVENTION

The present invention is directed to a device for producing a plane of laser light for use as a reference plane for controlling machines and equipment which device is free of moving parts and is capable of providing a plane extending from the device with an angular range of 360°. The device for accomplishing this task utilizes a laser for producing a laser beam, and a conical reflecting surface with an apex angle of 90° which reflecting surface is mounted in the beam path of the laser to convert the laser beam into the plane of light. Preferably, the conical reflecting surface is provided by a glass cone having a mirrored outer circumference which cone is a right cone and is mounted with the cone axis on the axis of the laser beam to provide a light plane extending in an angular range of 360° from the device. By coaxially positioning the axis of the cone with the axis of the laser beam, the reference plane will extend perpendicular to the axis of the laser beam and will have equal intensity in all directions. By tilting or adjusting the axis of the cone with respect to the axis of the laser beam, the inclination of the plane of light to the laser beam can be adjusted.

BRIEF DESCRIPTION OF THE DRAWING

The FIGURE schematically illustrates the device of the present invention.

DESCRIPTION OF THE PREFERRED EMBODIMENT

The principles of the present invention are particularly useful in a device illustrated in the FIGURE which includes a laser 1 for producing a laser beam 4 of a bundle of parallel extending laser rays. As illustrated, the laser device 1 is mounted by a stand 2 with the axis of the beam 4 extending in a vertical direction. To convert the beam 4 into a plane 5 of laser light, means providing a conical reflecting surface 3 having an apex angle of 90° is arranged in the path of the laser beam 4, by a conventional mounting means. Preferably, the conical reflecting surface 3 is provided by a glass cone which is a right cone and has a mirrored outer circumference.

If the means for mounting the cone forming the conical reflecting surface 3 places the axis of the conical surface 3 coaxially with the axis of the laser beam 4, the beam 4 will be converted into a plane 5 extending perpendicular to the axis of the beam 4 over an angular range of 360° from the device with the intensity of the light which is extending in all directions being substantially equal. If the means for mounting the cone forming the conical surface 3 is adjustable for varying the inclination of the axis of the conical reflecting surface 3 with respect to the axis of the laser beam 4, an adjustment in the angle of inclination of the plane 5 with respect to the axis of the laser beam 4 can be made.

By off-setting the axis of the conical surface 3 from the axis of the laser beam 4, the intensity of the light in the plane 5 can be increased in a particular segment thereof. In utilizing this device, the conical reflecting surface 3 is preferably a mirrored surface of at least a part of the outer circumferential surface of a right circular cone. While a reference plane, which extends from the device along an angular sector, is sufficient for many purposes, the present invention also enables positioning the conical reflecting surface 3 with its axis extending across the axis of the beam 4 to provide a reference plane extending in an angular range of 360°.

Some of the advantages of the device of the present invention over the prior art device besides avoiding mechanically moving parts and energy consuming motors are that each direction extending from the device can be provided with a steady plane of radiation which enables the application of a high modulation frequency to the radiation by modulating the laser beam which enables the use of improved reception devices with high frequency amplifiers. In the prior art device one had to depend upon the relatively low rotational frequency of the deflecting motor to provide modulation of the beam. Another advantage of the present device over the prior art device is that a definite inclination of the light plane can be provided by means of tilting the cone axis relative to the axis of the laser beam. A still further advantage of the present device is that a plane extending at a smaller angle than a full 360° from the device can be produced by applying the radiation of the laser beam to a small part of the mirrored surface of the cone for reflection onto the reference plane. Any portion of the reference plane in which radiation is not desired can be eliminated without loss of energy due to covering or absorbing the radiation by proper positioning of the conical reflecting surface.

Although various minor modifications might be suggested by those versed in the art, it should be understood that we wish to employ within the scope of the patent granted hereon all such modifications as reasonably, and properly come within the scope of our contribution to the art.

We claim:

1. A device for converting a laser beam into a plane of laser light for use as a reference plane in controlling equipment such as earth moving machines, comprising a laser source providing a collimated laser beam, a right circular conical reflecting surface having an external reflecting surface, said conical reflecting surface being arranged in the path of the laser beam so that said right circular conical reflecting surface converts said collimated laser beam into a plane of light.

2. A device according to claim 1, wherein said conical reflecting surface is arranged on the axis of said collimated laser beam to provide a light plane extending from the device through an angular range of 360°.

3. A device according to claim 2, wherein said conical reflecting surface is adjustably mounted with respect to said axis of said collimated laser beam to enable adjustment of the inclination between the axis of said conical reflecting surface and said axis of said collimated laser beam to vary the inclination of the light plane with respect to said axis of said collimated laser beam.

4. A device according to claim 2, wherein said conical reflecting surface is provided by a glass cone with a mirrored outer circumference.

5. A device according to claim 4, wherein said glass cone forming said conical reflecting surface is adjustably mounted with respect to said collimated laser beam to enable adjustment in the inclination between the axis of said glass cone and said axis of said collimated laser beam to adjust the inclination of the plane of laser light with respect to said axis of said collimated laser beam.

6. A device according to claim 1, wherein said conical reflecting surface is provided by a glass cone with a mirrored outer circumference.

7. A device according to claim 6, wherein said glass cone is adjustably mounted with respect to the axis of said collimated laser beam to enable adjustment in the inclination between the axis of said glass cone and said axis of said collimated laser beam to adjust the inclination of the plane with respect to said axis of said collimated laser beam.

8. A device according to claim 1, wherein said conical reflecting surface is adjustably mounted with respect to said collimated laser beam to enable adjustment in the inclination between the axis of said conical reflecting surface and the axis of the laser beam to vary the inclination of the light plane with respect to said axis of said collimated laser beam.

9. A device according to claim 1, wherein said conical reflecting surface is formed by a glass cone with a mirrored outer circumference, said glass cone being mounted with its axis coaxial with the axis of said collimated laser beam to provide a light plane extending 360° from the device with substantially equal intensity.

* * * * *

Notice of Adverse Decision in Interference

In Interference No. 98,871, involving Patent No. 3,820,903, H. Kindl and V. Met, DEVICE FOR PRODUCING A LIGHT PLANE, final judgment adverse to the patentees was rendered Jan. 19, 1977, as to claims 1–9.

[*Official Gazette July 5, 1977.*]